United States Patent
Duggan et al.

(10) Patent No.: US 7,052,243 B2
(45) Date of Patent: May 30, 2006

(54) PRESSURE REGULATING VALVE

(75) Inventors: Gerard Duggan, Duxbury, MA (US); Robert Lombari, North Smithfield, RI (US); David van Houten, Stevensville, MI (US)

(73) Assignee: Flexcon Industries, Randolph, MA (US)

( * ) Notice: Subject to any disclaimer, the term of this patent is extended or adjusted under 35 U.S.C. 154(b) by 0 days.

(21) Appl. No.: 10/936,243

(22) Filed: Sep. 7, 2004

(65) Prior Publication Data

US 2005/0118031 A1 Jun. 2, 2005

Related U.S. Application Data

(63) Continuation of application No. 10/702,067, filed on Nov. 5, 2003, now abandoned, which is a continuation of application No. 09/932,303, filed on Aug. 17, 2001, now Pat. No. 6,644,929.

(60) Provisional application No. 60/226,219, filed on Aug. 18, 2000.

(51) Int. Cl.
*F04B 49/06* (2006.01)

(52) U.S. Cl. .................. 417/26; 417/44.2; 417/441; 417/296

(58) Field of Classification Search ............... 417/26, 417/44.2, 441, 296
See application file for complete search history.

(56) References Cited

U.S. PATENT DOCUMENTS

| | | | |
|---|---|---|---|
| 3,782,858 A | 1/1974 | Deters | 417/26 |
| 3,814,543 A | 6/1974 | Gritz | 417/26 |
| 3,857,407 A | 12/1974 | Olson | 137/495 |
| 3,922,111 A | 11/1975 | Deters | 417/26 |
| 3,931,830 A | 1/1976 | Gritz | 137/505.45 |
| 4,165,951 A * | 8/1979 | Friedman et al. | 417/26 |
| 4,170,849 A | 10/1979 | Sakulevich et al. | 51/7 |
| 4,306,386 A | 12/1981 | Sakulevich et al. | 51/317 |
| 4,821,466 A | 4/1989 | Kato et al. | 51/317 |
| 5,197,234 A | 3/1993 | Gillenwater | 51/310 |
| 5,419,735 A | 5/1995 | Imahashi et al. | 451/113 |
| 5,988,984 A | 11/1999 | Austin | 417/44.2 |
| 6,036,580 A | 3/2000 | Igelshteyn et al. | 451/36 |
| 6,109,296 A * | 8/2000 | Austin | 137/513.5 |

OTHER PUBLICATIONS

International Search Report issued for corresponding PCT application PCT/US01/25759.
AquaGenie 400 "Owners Manual and Installation Guide" Mar., 2000.

* cited by examiner

Primary Examiner—Charles G. Freay
(74) Attorney, Agent, or Firm—Choate, Hall & Stewart LLP; Valarie B. Rosen

(57) ABSTRACT

A pressure maintenance assembly for a domestic water well system. The assembly comprises a pressure maintenance valve having an inlet side and an outlet side, a pressure tank in fluidic communication with the outlet side, and a calibrated bypass. When the valve is closed, the calibrated bypass provides fluidic communication between the inlet side and the outlet side. The size of the calibrated bypass and the pressure tank are adapted and constructed to permit a flow rate between the inlet side and the outlet side that will fill the pressure tank in a time interval less than twice the time required to pump a volume of water that will dissipate heat generated by the pump when it is turned on.

20 Claims, 3 Drawing Sheets

PRESSURE REGULATING VALVE

This application is a continuation of and claims priority of U.S. patent application Ser. No. 10/702,067, filed Nov. 5, 2003 now abandoned, which is a continuation of and claims priority from U.S. patent application Ser. No. 09/932,303, filed Aug. 17, 2001, now U.S. Pat. No. 6,644,929, and Provisional U.S. Patent Application No. 60/226,219, filed Aug. 18, 2000, the entire contents all of which are incorporated by reference herein.

FIELD OF THE INVENTION

This invention pertains to pressure maintenance assemblies, more particularly to pressure regulating valves for a water well system.

BACKGROUND OF THE INVENTION

Domestic water systems are used to supply running water to households from a local water source, such as a well, lake, reservoir, cistern or other potable water source. A conventional water system includes an electric pump, a pressure tank and a pressure switch. The pressure tank allows the operation of the system within a preset range without undo cycling of the pump. This range is determined by the pressure switch that activates and deactivates the pump. The pump is connected to the inlet port of the water system and is controlled by the pressure switch, which measures fluctuations in water pressure within the pressure tank. Water is initially supplied to a user from the pressure tank. The pressure switch detects the resulting decrease in water pressure to the preset cut-in pressure and turns the pump on, increasing the flow of water to the inlet port of the water system and providing flow to both meet system demand and to re-fill the pressure tank. To prevent the water pressure from damaging the components of the water system, the pressure switch has a cut-out pressure at which it turns the pump off. As the pressure tank is refilled, its pressure increases until the cut-out pressure is achieved and the pump is turned off. However, during periods of peak demand, like multiple fixture or appliance usage and irrigation, the tank pressure increases and decreases quickly, causing the pump to cycle on and off again within a short time. The resultant water pressure fluctuation from high to low and back to high is bothersome to the user, and the rapid pump cycling causes increased wear and tear to the pump and motor.

SUMMARY OF THE INVENTION

In one aspect the invention is a domestic water well pressure maintenance assembly. The pressure maintenance assembly includes a pressure maintenance valve having an inlet side and an outlet side, a pressure tank in fluidic communication with the outlet side, a pressure switch, and a calibrated bypass. The pressure switch turns the pump on when a pressure in the outlet side is at a cut-in pressure and off when the pressure is at a cut-out pressure. When the valve is closed, the calibrated bypass provides fluidic communication between the inlet side and the outlet side. The size of the calibrated bypass and the size of the pressure tank are adapted and constructed to permit a flow rate between the inlet side and the outlet side that will fill the pressure tank in a time interval less than twice the time required to pump a volume of water that will dissipate heat generated by the pump when it is turned on.

The pressure maintenance valve may further include a movable member interposed between the inlet side and the outlet side, a diaphragm, an adjustable spring, and a communication port providing fluidic communication between the outlet side and the diaphragm via which pressure is imparted on the diaphragm. A pressure drop between the inlet side and the outlet side is moderated by an amount of displacement of the movable member with respect to a first position, and a tension in the spring enables the diaphragm to displace the movable member with respect to the first position against pressure imparted by fluid in the outlet side. The calibrated bypass may include a hole or groove disposed in either the movable member or a seat for the movable member. A number of pump cycles per day may be less than about 40%, about 50%, or about 60% of a number of pump cycles per day in a water system comprising a pump, a pressure switch, and a pressure tank, in which there is not a pressure maintenance valve interposed between the pump and the pressure tank. The outlet side of the valve may comprise first and second outlets, and the second outlet may be adapted and configured to receive the pressure tank. The pressure maintenance assembly may further comprise an accessory fitting threadably attached to the outlet side and adapted and configured to receive one or more of a pressure switch, a pressure gauge, a release valve, and a drain valve. The calibrated bypass may be adapted and constructed to escort sufficient water from the inlet side to the outlet side to cool the pump when the valve is closed while the pump is on.

In one exemplary embodiment, the pump has a capacity between 5 and 15 GPM, the valve has an inlet with a one inch diameter, the pressure tank has a total capacity approximately between 15 and 30 gallons, and the calibrated bypass has a cross-sectional area of about 0.0075 square inches. In another exemplary embodiment, the pump has a capacity approximately between 15 and 30 GPM, the valve has an inlet with a diameter of about 1.25 inches, the pressure tank has a total capacity approximately between 30 and 50 gallons, and the calibrated bypass has a cross-sectional area of about 0.0095 square inches.

In another aspect, the invention is a method of configuring a water well pressure maintenance assembly. The method comprises selected a desired maximum flow rate through a plumbing system in fluidic communication with the assembly, selecting a pump having sufficient capacity to deliver the maximum flow rate, and selecting a valve for the assembly that has a pre-determined pressure drop at the maximum flow rate. The valve comprises an inlet side to which water is provided by the pump, an outlet side from which water is delivered to a user, and a calibrated bypass that provides fluidic communication between the inlet side and the outlet side when the valve is closed. The time required to fill a pressure tank in fluidic communication with the outlet side is less than twice that required to flow sufficient water over the pump to dissipate heat generated by the pump when it is started. The method may further comprise selecting a cut-in outlet side pressure at which the pump is turned on and a cut-out outlet side pressure at which the pump is turned off.

In another aspect, the invention is a method of optimizing a pressure maintenance assembly comprising a valve having an outlet side and an inlet side in fluidic communication with a pump, a pressure tank in fluidic communication with the outlet side, a pressure switch that turns the pump on and off in response to a pressure in the outlet side, and a calibrated bypass that provides fluidic communication between the inlet side and the outlet side when the valve is closed. The method comprises selecting a size for at least one of the pressure tank, the valve, and the calibrated bypass such that a time interval required for the pump to fill the tank is less than twice as long as required to dissipate heat generated by the pump when it is turned on. The selected size may permit the pump to direct sufficient water through the calibrated bypass to cool the pump when the valve is closed. The method may further comprise providing an outlet for the valve that is adapted and constructed to receive the pressure tanks. In addition, the method may comprise providing an accessory fitting threadably attachable to the outlet side and adapted and configured to receive one or more of a pressure switch, a pressure gauge, a release valve, and a drain valve.

In another aspect, the invention is a pressure maintenance valve. The valve includes an inlet side and an outlet side in fluidic communication, a movable member interposed between the inlet side and the outlet side whose displacement with respect to a first position moderates a pressure drop between the inlet side and the outlet side, a diaphragm, an adjustable spring whose tension enables the diaphragm to displace the movable member with respect to the first position against a pressure imparted by a fluid in the outlet side, a communication port via which pressure is imparted on the diaphragm from the outlet side, a calibrated bypass that provides fluidic communication between the inlet side and the outlet side when the movable member is in the first position, and first and second outlets in fluidic communication with the outlet side. The second outlet is adapted and constructed to receive a pressure tank. The second outlet may include a union with a flat gasket.

BRIEF DESCRIPTION OF THE DRAWING

The invention is described with reference to the several figures of the drawing, in which.

DESCRIPTION OF THE PREFERRED EMBODIMENT

Figure 1:
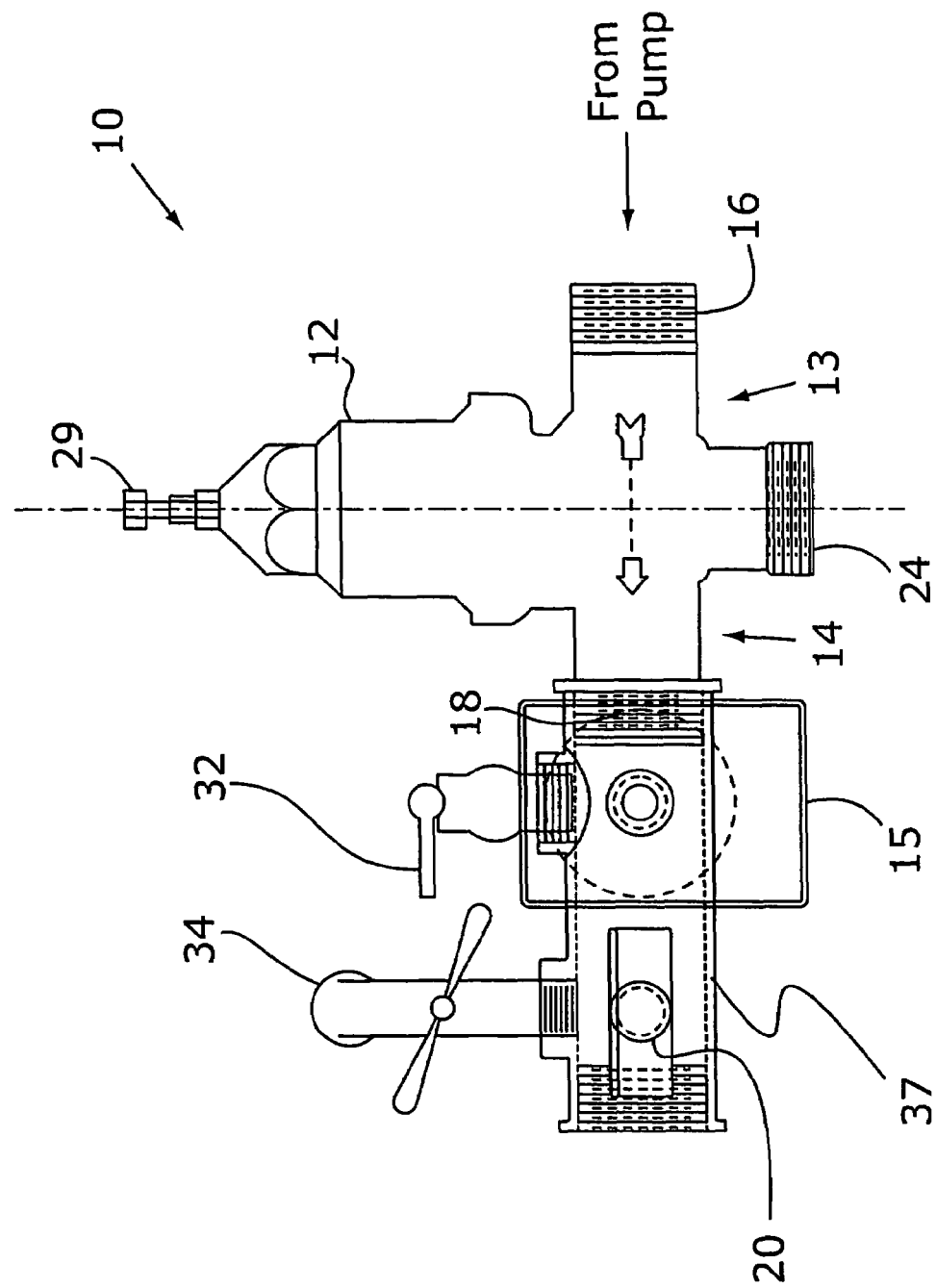
FIG. 1 is an exterior view of a pressure maintenance assembly according to an embodiment of the invention.

With reference to FIG. 1, a pressure maintenance assembly 10 includes a pressure regulating valve 12 with inlet side 13 and outlet side 14. Inlet side 13 includes inlet port 16 through which water may flow from a water source, for example, a well. A pump may be interposed between the source and the inlet to provide water pressure. The outlet side 14 includes a supply outlet 18 via which water is discharged to the user. Additional outlets may also be incorporated into the valve. In one embodiment, the inlet and outlet(s) include either a 1"×¾" or a 1¼"×1" dual male/female threaded fitting to connect the valve 12 to the remainder of a plumbing system. One skilled in the art will recognize that the inlet and outlet(s) may be manufactured with different sized fittings depending on capacity.

Figure 2:
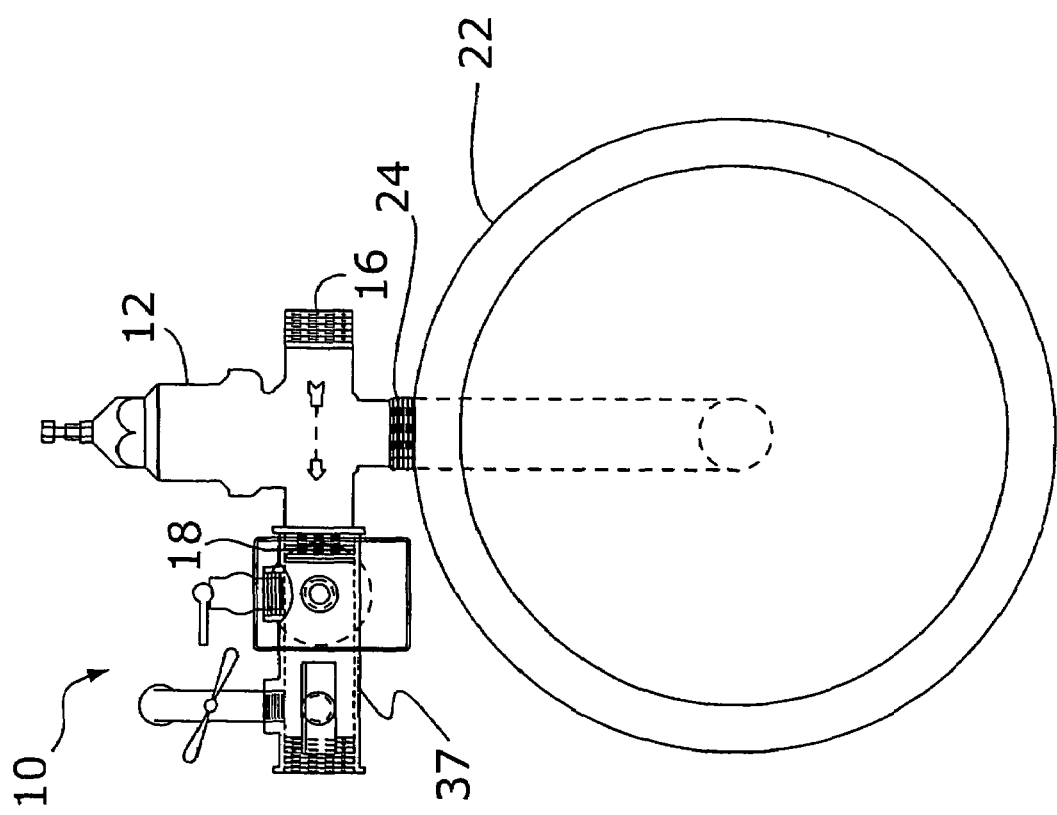
FIG. 2 is a cut-away view of the pressure maintenance valve depicted in FIG. 1, including a pressurized water tank.

A pressure tank 22 is connected to the valve 12 via tank outlet 24 (FIG. 2). A typical pressure tank includes an outer enclosure and an inner diaphragm. As water fills the diaphragm, it compresses air trapped between the diaphragm and the enclosure, pressurizing the tank. The pressure maintenance assembly 10 limits the water pressure within the pressure tank 22 and the outlet side 14 to a predetermined pressure range.

When a user draws water from the system, the initial supply ("drawdown") is provided by the pressure tank 22 via tank outlet 24 through supply outlet 18. As water is drawn from the tank 22, the pressure in the outlet side 14 decreases to a specified cut-in pressure, for example, a pressure between 20–40 psi. A pressure switch 15 connected to outlet side 14 then turns the pump on. The pump pushes water through inlet 16 and valve 12. Most of the water flows through supply outlet 18 to the user; any residual flow is used to refill the pressure tank 22.

Figure 3:
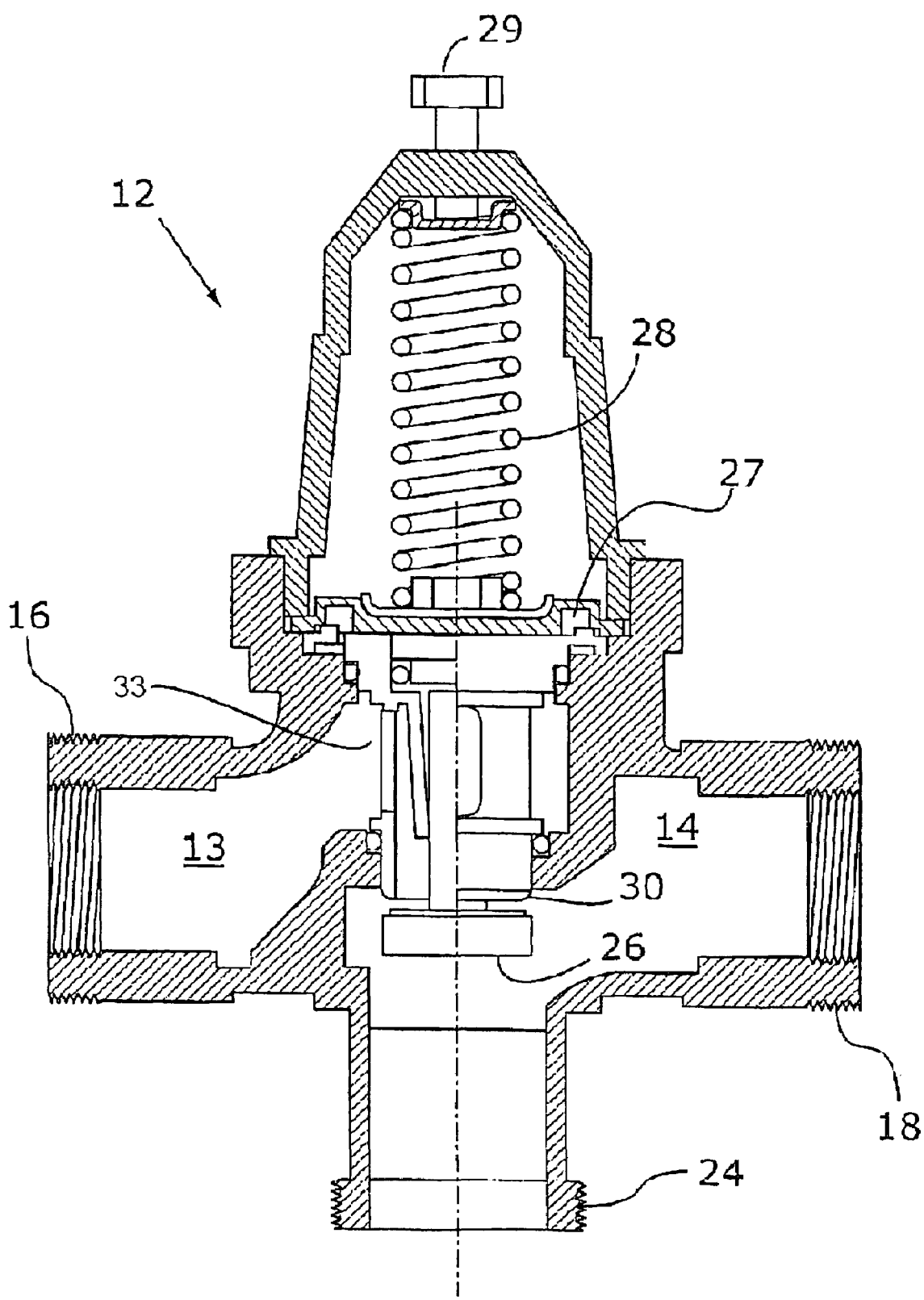
FIG. 3 is a cut-away view of a valve in the pressure maintenance assembly.

Flow through valve 12 is regulated by moveable member 26 (FIG. 3). Flexure of diaphragm 27 determines the displacement of moveable member 26 from seat 30. A communication port 33 provides fluidic communication between outlet side 14 and diaphragm 27. The pressure in outlet side 14 opposes pressure exerted on diaphragm 27 by an adjustable spring 28. The tension in spring 28 may be adjusted by tightening or loosening screw 29. The total pressure that diaphragm 27 exerts on moveable member 26 is the pressure exerted by the spring 28 less the water pressure in the outlet side 14 exerted via communication port 33. As the pressure increases in outlet side 14, the net pressure exerted against moveable member 26 by diaphragm 27 is reduced. The diaphragm 27 retracts moveable member 26 towards seat 30, increasing the internal pressure drop through valve 12. As the pressure in outlet side 14 decreases, the pressure exerted on diaphragm 27 via communication port 33 is reduced. Diaphragm 27 displaces moveable member 26 further from seat 30, decreasing the internal pressure drop through valve 12. Because the pressure drop through the valve 12 is continuously adjusted with respect to the pressure in outlet side 14, the water pressure provided to an end user is independent of flow through the valve over a given range of flow. As a result, the end user perceives a consistent water pressure whether he or she is filling a glass of water or watering the lawn.

Figure 4:
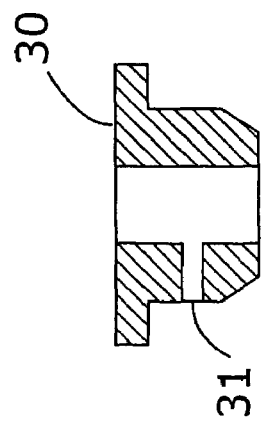
FIG. 4 is a cross section of a seat portion of a valve in the pressure maintenance assembly.

When the demand for water stops, flow through supply outlet 18 stops. However, the pump continues to run, driving water into tank 22. As the tank fills, the pressure in outlet side 14 increases. When the outlet side 14 pressure exceeds the tension in spring 28, the diaphragm 27 fully retracts moveable member 26 against seat 30, preventing free flow through the valve 12 and preventing a further increase in pressure in outlet side 14. The tension in the spring 28 is typically set a few psi, for example, between 5 and 10 psi, below the cut-out pressure for the pump, which may range from 40–60 psi. As a result, pressure switch 15, which is connected to outlet side 14, is not exposed to a pressure exceeding the cut-out pressure for the pump, and the pump continues to run (FIG. 1). A calibrated bypass 31, for example, a hole or groove, cut into seat 30 or moveable member 26 allows a minimum water flow through valve 12 from the pump to continue filling and pressurizing the tank 22 (FIG. 4). When the pressure in outlet side 14 reaches the cut-out point, the pressure switch 15 turns off the pump.

The size of the calibrated bypass 31 is determined primarily by the minimum cooling flow demands of the pump motor and the available drawdown in the pressure tank. The size of the calibrated bypass is selected to avoid excessive after-demand run times of the pump and achieve minimum pump run times to meet leak load and low demand. Calibrated bypass 31 should be at least large enough to allow a minimum cooling flow across the pump motor, minimizing the risk of overheating and prolonging pump life. The minimum cooling flow is typically set by the motor manufacturer and generally increases with pump capacity. As pump motor capacity increases, the size of the calibrated bypass should be adjusted to ensure that minimum cooling flow is achieved. The recommended flow rate varies with motor size, pump capacity, pump casing diameter, and well size. For example, a minimum cooling flow around 1 GPM may be preferred for a 15 GPM pump. However, a larger bypass than that required to provide minimum cooling flow may be desired to reduce the operating time for the pump. Use of a calibrated bypass reduces the after-fill time, the time required to fill the tank 22 after demand stops. As a result, the pump is shut off sooner, reducing pumping time and energy use.

The pressure tank size and properly calibrated bypass and valve should also be sufficiently large to protect the pump from leaks and low demand uses. The pump should not come on to supply a user with the few cups of water required to fill an ice cube tray. Slow leaks through the system should also not cause the pump to cycle. A properly sized pressure tank has enough capacity to fulfill several small demand uses without reducing the outlet side 14 pressure below the cut-in point of the pressure switch. This reduces the number of operating cycles per day, reducing wear and tear on the pump. While some manufacturers recommend a maximum of 300 cycles, a typical four person household might only use enough water to cause the pump to turn on 20–30 times a day. Addition of a pressure maintenance valve with a properly calibrated bypass to a conventional water well system having a pump, pressure tank, and pressure switch can reduce the number of cycles per day by 40%, 50%, 60%, or even more.

The preferred capacity for the tank depends in part on the cut-in point of the pressure switch, for example, 20, 30 or 40 psi. The minimum volume pumped during a pump cycle is equal to the drawdown volume, the volume that the system delivers from the pressure tank 22 between the preset cut-out pressure and the preset cut-in pressure (i.e., the user draws exactly the drawdown volume through the system). The cut-in point and the drawdown volume should be coordinated to ensure that the pump can run for the allotted time.

Once the decreasing water volume in the pressure tank drops the system pressure to the preset cut-in pressure, the sizes of the pressure tank and the calibrated bypass ensure that the pump will cycle long enough to dissipate the heat generated by the starting current, i.e., for the pump's minimum run time. The minimum run time depends both on the pump capacity and the size of the motor within the pump. For example, a 5–15 GPM pump with a 4 inch motor may require a minimum run time of one minute. While increased run times increase energy consumption, they increase pump lifetime by ensuring that the heat generated by the start-up current is fully dissipated before the pump is turned off. To optimize energy use, the calibrated bypass and tank should be sized so that the after-fill time is close to the time required to dissipate the heat from the start-up current, while ensuring that the flow rate is high enough to cool the pump. Preferably, the time required to refill the tank after demand stops is less than twice the minimum run time for the pump.

The pressure maintenance assembly 10 includes a pump, valve, and pressure tank that are coordinated to optimize the performance of the system while providing a consistent pressure to the user. The calibrated bypass is resized for systems having different capacities. For example, for a pump having a capacity between 5 and 15 GPM and a 1 in. diameter valve, a pressure tank having an total volume approximately between 15 and 30 gallons should be connected to the system and the calibrated bypass should have a cross-sectional area of about 0.0075 sq. in. This allows an after-fill time of about 1 minute. Alternatively, for a system with a 15–30 GPM pump and a 1.25 in. valve, the pressure tank should have an total capacity approximately between 30 and 50 gallons, and the calibrated bypass should have a cross-sectional area of about 0.0095, which allows an after-fill time of about two minutes. One skilled in the art will recognize that the values given above are approximate. Differences in machining, and pressure tank and pressure switch settings may lead to variations in the size and/or volume of various components, flow rates, and after-fill times.

If the pressure in outlet side 14 should exceed safe operating levels, a one-way relief valve 32 connected to the outlet side 14 may be employed to release the pressure. A drain valve 34 may be connected to the outlet side 14 of the valve 12. A pressure gauge 20 may also be threadably connected to outlet side 14. Pressure gauge 20, pressure switch 15, relief valve 32, and drain 34 may be connected to threaded ports in the outlet side 14 of valve 12 to form a single monolithic apparatus. However, it may be more convenient to incorporate them into one or more separate pieces, such as accessory fitting 37, connected to supply outlet 18 (FIG. 1). One skilled in the art will recognize that the threading on accessory fitting 37 should be compatible with that on supply outlet 18.

Use of accessory fitting 37 and the design of valve 10 facilitate quick installation of the pressure maintenance assembly. In one embodiment, tank outlet 24 is a union with a flat gasket that mates directly to a fitting on tank 22. Accessory fitting 37 enables the pressure maintenance assembly to be installed as a ready-to-use package. Instead of having to install multiple T's and pipe fittings to attach the various valves and gauges to the assembly, a plumber or even a skilled homeowner can install the pressure maintenance assembly as a monolithic part, thread the union onto the pressure tank, and turn on the water. The reduced number of connections and joints also minimizes the risk of leaks.

EXAMPLES

Example 1

A typical 2500 sq. ft house with four residents and 1.5 bathrooms will have a maximum water use rate of 7 GPM. In the summer, if the house has an irrigation system, the maximum usage might go up to 12 GPM. A 15 GPM pump with a tank having a total volume of about 20 gal. will provide sufficient flow for the household's needs. The valve between the pump and the tank has 1" fittings and a 0.098 in. diameter (0.0075 sq. in. cross-sectional area) calibrated bypass to allow the tank to fill once demand ceases. The calibrated bypass allows an after-fill time of about 90 seconds.

Example 2

A larger house with a heat pump system may have a maximum demand of 24 GPM. A 30 GPM pump is used to supply the house. The tank size should be increased, for example, to a total volume of 44 gal., and the valve inlet diameter increased to 1.25 in. to accommodate the increased flow. A larger calibrated bypass, 0.110 in. in diameter (0.0095 sq. in. cross-sectional area) allows an after-fill time of about two minutes.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. Domestic water well pressure maintenance assembly, comprising:
    a pressure maintenance valve having an inlet side and an outlet side;
    a pressure tank in fluidic communication with the outlet side;
    a pump in fluidic communication with the outlet side;
    a pressure switch, wherein the pressure switch turns the pump on when a pressure in the outlet side is at a cut-in pressure and off when the pressure is at a cut-out pressure; and
    a calibrated bypass, wherein, when the valve is closed, fluidic communication between the inlet side and the outlet side is provided solely by the calibrated bypass,
    wherein the size of the calibrated bypass and the size of the pressure tank are adapted and constructed to permit a flow rate between the inlet side and the outlet side that will fill the pressure tank in a time interval less than twice the time required to pump a volume of water that will dissipate heat generated by the pump when it is turned on.

2. The domestic water well pressure maintenance assembly of claim 1, wherein the pressure maintenance valve further comprises:
    a moveable member interposed between the inlet side and the outlet side, wherein a pressure drop between the inlet side and the outlet side is moderated by an amount of displacement of the moveable member with respect to a first position;
    a diaphragm;
    an adjustable spring, wherein a tension in the spring enables the diaphragm to displace the moveable member with respect to the first position against a pressure imparted by a fluid in the outlet side; and
    a communication port providing fluidic communication between the outlet side and the diaphragm, wherein the pressure is imparted on the diaphragm via the communication port.

3. The pressure maintenance assembly of claim 2, wherein the calibrated bypass comprises a hole or groove disposed in a member of the movable member and a seat for the movable member.

4. The pressure maintenance assembly of claim 1, wherein a number of pump cycles per day is less than about 40% of a number of pump cycles per day in a water system comprising a pump, a pressure switch, and a pressure tank, in which there is not a pressure maintenance valve interposed between the pump and the pressure tank.

5. The pressure maintenance assembly of claim 4, wherein the number of pump cycles per day is less than about 50% of the number of pump cycles per day in a water system comprising a pump, a pressure switch, and a pressure tank, in which there is not a pressure maintenance valve interposed between the pump and the pressure tank.

6. The pressure maintenance assembly of claim 5, wherein the number of pump cycles per day is less than about 60% of the number of pump cycles per day in a water system comprising a pump, a pressure switch, and a pressure tank, in which there is not a pressure maintenance valve interposed between the pump and the pressure tank.

7. The pressure maintenance assembly of claim 1, wherein the outlet side of the valve comprises first and second outlets, and wherein the second outlet is adapted and configured to receive the pressure tank.

8. The pressure maintenance assembly of claim 1, further comprising an accessory fitting threadably attached to the outlet side and adapted and configured to receive a member of the group consisting of a pressure switch, a pressure gauge, a relief valve, a drain valve, and any combination of the above.

9. The pressure maintenance assembly of claim 1, wherein the calibrated bypass is adapted and constructed to escort sufficient water from the inlet side to the outlet side to cool the pump when the valve is closed while the pump is on.

10. The pressure maintenance assembly of claim 1, wherein:
    the pump has a capacity approximately between 5 and 15 GPM,
    the valve has an inlet with a diameter of about 1 in.,
    the pressure tank has a total capacity approximately between 15 and 30 gallons, and
    the calibrated bypass has a cross-sectional area of about 0.0075 sq. in.

11. The pressure maintenance assembly of claim 1, wherein:
    the pump has a capacity approximately between 15 and 30 GPM,
    the valve has an inlet with a diameter of about 1.25 in.,
    the pressure tank has a total capacity approximately between 30 and 50 gallons, and
    the calibrated bypass has a cross-sectional area of about 0.0095 sq. in.

12. A method of configuring a water well pressure maintenance assembly, comprising:
    selecting a desired maximum flow rate through a plumbing system in fluidic communication with the assembly;
    selecting a pump having sufficient capacity to deliver the maximum flow rate; and
    selecting a valve for the assembly that has a predetermined pressure drop at the maximum flow rate, wherein the valve comprises an inlet side to which water is provided by the pump, an outlet side from which water is delivered to a user, and a calibrated bypass that provides fluidic communication between the inlet side and the outlet side when the valve is closed, wherein the time required to fill a pressure tank in fluidic communication with the outlet side is less than twice that required to flow sufficient water over the pump to dissipate heat generated by the pump when it is started.

13. The method of claim 12, further comprising selecting a cut-in outlet side pressure at which the pump is turned on and a cut-out outlet side pressure at which the pump is turned off.

14. The method of claim 12, wherein the calibrated bypass escorts sufficient water from the inlet side to the outlet side to cool the pump when the valve is closed while the pump is on.

15. The method of claim 12, further comprising selecting a size of the pressurized water tank.

16. The method of claim 15, wherein a number of pump cycles per day is less than about 40% of a number of pump cycles per day in a water system comprising a pump, a pressure switch, and a pressure tank, in which there is not a pressure maintenance valve interposed between the pump and the pressure tank.

17. The pressure maintenance assembly of claim 16, wherein the number of pump cycles per day is less than about 50% of the number of pump cycles per day in a water system comprising a pump, a pressure switch, and a pressure tank, in which there is not a pressure maintenance valve interposed between the pump and the pressure tank.

18. The pressure maintenance assembly of claim 17, wherein the number of pump cycles per day is less than about 60% of the number of pump cycles per day in a water system comprising a pump, a pressure switch, and a pressure tank, in which there is not a pressure maintenance valve interposed between the pump and the pressure tank.

19. The method of claim 15, wherein:
the calibrated bypass has a cross-sectional area of about 0.0075 sq. in. when the pump has a capacity approximately between 5 and 15 GPM and the tank has a total volume approximately between 15 and 30 gallons; and
the calibrated bypass has a cross-sectional area of about 0.0095 sq. in. when the pump has a capacity approximately between 15 and 30 GPM and the tank has a total volume approximately between 30 and 50 gallons.

20. A method of optimizing a pressure maintenance assembly comprising a valve having an outlet side and an inlet side in fluidic communication with a pump, a pressure tank in fluidic communication with the outlet side, a pressure switch that turns the pump on and off in response to a pressure in the outlet side, and a calibrated bypass that provides fluidic communication between the inlet side and the outlet side when the valve is closed, comprising selecting a size for at least one member of the pressure tank, the valve, and the calibrated bypass, wherein a time interval required for the pump to fill the tank is less than twice as long as required to dissipate heat generated by the pump when it is turned on.

* * * * *